United States Patent
Maley (10) Patent No.: US 11,574,534 B2
(45) Date of Patent: Feb. 7, 2023

(54) SYSTEMS AND METHODS TO RETRIGGER DETECTION BASED PROXIMITY ALARM SYSTEMS

(71) Applicant: Caterpillar Inc., Peoria, IL (US)

(72) Inventor: Jacob C. Maley, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/364,543

(22) Filed: Jun. 30, 2021

(65) Prior Publication Data
US 2023/0005356 A1  Jan. 5, 2023

(51) Int. Cl.
| | | |
|---|---|---|
| G08G 1/16 | (2006.01) | |
| G08B 21/22 | (2006.01) | |
| G06T 7/70 | (2017.01) | |
| G08B 5/22 | (2006.01) | |
| G08B 3/10 | (2006.01) | |

(52) U.S. Cl.
CPC .............. *G08B 21/22* (2013.01); *G06T 7/70* (2017.01); *G08B 3/10* (2013.01); *G08B 5/22* (2013.01)

(58) Field of Classification Search
CPC .. G08B 21/22; G08B 3/10; G08B 5/22; G06T 7/70
See application file for complete search history.

(56) References Cited

U.S. PATENT DOCUMENTS

| | | | | |
|---|---|---|---|---|
| 3,611,344 A | * | 10/1971 | Couper | B60K 28/06 123/198 DC |
| 5,493,269 A | * | 2/1996 | Durley | B60Q 1/50 340/901 |
| 8,275,847 B2 | | 9/2012 | Lewis | |
| 9,550,500 B2 | * | 1/2017 | Hackenberg | B60K 28/06 |
| 9,834,975 B2 | | 12/2017 | Pignolet et al. | |
| 9,836,059 B2 | * | 12/2017 | Hiramatsu | B60Q 5/005 |
| 2006/0114124 A1 | * | 6/2006 | Vickas | G08G 1/166 340/905 |

(Continued)

FOREIGN PATENT DOCUMENTS

EP  3537403 A1  9/2019

OTHER PUBLICATIONS

Written Opinion and International Search Report for Int'l. Patent Appln. No. PCT/US2022/030218, dated Aug. 26, 2022 (12 pgs).

*Primary Examiner* — Hai Phan
*Assistant Examiner* — Son M Tang
(74) *Attorney, Agent, or Firm* — von Briesen & Roper, s.c.

(57) ABSTRACT

A proximity warning system including cameras positioned on a machine, processors, and one or more memory devices including instructions for execution by the processors. The system includes instructions to receive, from the cameras, image data depicting an object within a field of view of the cameras. The system includes instructions to derive a first distance between the object and the machine based on the image data and an alarm is triggered when the first distance is less than a first threshold distance. The system can include instructions to receive a request to snooze the alarm and discontinue the alarm. Additional image data can be received from the cameras and a second distance between the object and the machine is derived based on the additional image data. The system includes instructions to cancel the snooze and retrigger the alarm when the second distance is less than a second threshold distance.

20 Claims, 9 Drawing Sheets

(56) References Cited

U.S. PATENT DOCUMENTS

| | | | | |
|---|---|---|---|---|
| 2007/0078600 | A1* | 4/2007 | Fregene | G08G 5/0021 |
| | | | | 701/301 |
| 2008/0183360 | A1* | 7/2008 | Zhang | B60W 50/14 |
| | | | | 340/436 |
| 2010/0241311 | A1* | 9/2010 | Baumann | G08G 1/162 |
| | | | | 701/36 |
| 2011/0178703 | A1* | 7/2011 | Aben | G01C 21/3423 |
| | | | | 340/932.2 |
| 2012/0287277 | A1* | 11/2012 | Koehrsen | H04N 7/181 |
| | | | | 348/148 |
| 2014/0168435 | A1* | 6/2014 | Tuhro | B60Q 1/48 |
| | | | | 348/148 |
| 2016/0042621 | A1* | 2/2016 | Hogg | G06V 40/20 |
| | | | | 348/155 |
| 2016/0176338 | A1* | 6/2016 | Husted | E02F 9/24 |
| | | | | 340/435 |
| 2017/0120813 | A1* | 5/2017 | Wilson | B60Q 9/00 |
| 2017/0139418 | A1* | 5/2017 | Hiramatsu | A01B 69/008 |
| 2017/0148319 | A1* | 5/2017 | Reeves | B60Q 9/00 |
| 2017/0294126 | A1* | 10/2017 | Russell, Jr. | H04R 1/403 |
| 2019/0093318 | A1 | 3/2019 | Izumikawa | |
| 2019/0171200 | A1* | 6/2019 | Celestin | B60W 40/09 |
| 2019/0193626 | A1* | 6/2019 | Park | B60W 40/105 |
| 2020/0070718 | A1* | 3/2020 | Tani | B60Q 5/006 |
| 2020/0156630 | A1* | 5/2020 | Schmidt | B60W 30/0956 |
| 2021/0100156 | A1* | 4/2021 | Iwase | G01S 7/497 |
| 2021/0107542 | A1* | 4/2021 | Cross | B61L 25/025 |
| 2021/0114638 | A1* | 4/2021 | Cross | B61L 23/06 |
| 2021/0174088 | A1* | 6/2021 | Maley | G06T 7/97 |
| 2022/0076033 | A1* | 3/2022 | Petrany | B60W 50/14 |

* cited by examiner

SYSTEMS AND METHODS TO RETRIGGER DETECTION BASED PROXIMITY ALARM SYSTEMS

TECHNICAL FIELD

This patent application is directed to proximity alarm systems, and more specifically, to retriggering detection based proximity alarm systems.

BACKGROUND

Proximity alarm systems used on machines, such as hydraulic excavators, typically have a method to acknowledge or snooze (pause) an audible alert for an object nearby and/or approaching the machine. Failure to snooze audible alarms, and to do so for a long enough duration, can lead to the safety system being disregarded or even disabled by an operator.

Given that additional concerns can emerge while an alarm system is snoozed, there have been efforts to establish criteria to retrigger a snoozed alarm. For example, U.S. Pat. No. 8,275,847 to Lewis (hereinafter "Lewis") describes an Interactive Maintenance Management System ("IMMS") which includes an alarm handling system for handling alarms that indicate present or imminent equipment failure. The IMMS may be used in industrial situations, such as strip-mines, to reduce equipment downtime and reduce or prevent equipment failure. Lewis's IMMS uses a flexible response system to track, analyze, and improve performance of the alarm handling system. As Lewis is directed to alarms related to equipment failure, the criteria Lewis defines for retriggering an alarm is not relevant to proximity alarm systems. For example, Lewis retriggers a snoozed alarm for required maintenance/repair after a maintenance facility becomes available.

Thus, there are still opportunities to improve proximity alarm systems used on machines to alert an operator to nearby and/or approaching objects. The example systems and methods described herein are directed toward overcoming one or more of the deficiencies described above and/or other problems with the prior art.

SUMMARY

In some embodiments, a proximity warning system can include one or more cameras positioned on a machine, one or more processors, and one or more memory devices. The memory devices can include instructions for execution by the one or more processors. The system can include instructions to receive, from the one or more cameras, image data depicting an object disposed within a field of view of the one or more cameras. The system can include instructions to derive a first distance between the object and the machine based on the image data, and an alarm is triggered when the first distance is less than a first threshold distance. The system can also include instructions to receive a request to snooze the alarm and discontinue the alarm. Additional image data can be received from the one or more cameras depicting the object, and a second distance between the object and the machine is derived based on the additional image data. The system can include instructions to cancel the snooze and retrigger the alarm when the second distance is less than a second threshold distance.

In some aspects, the system further comprises instructions to: receive a second request to snooze the alarm; receive, from the one or more cameras, further image data depicting the object; derive a third distance between the object and the machine based on the further image data; and cancel the second snooze and retrigger the alarm when the third distance is less than a third threshold distance. According to some aspects, the first threshold distance corresponds to a visual alarm and the second and third threshold distances correspond respectively to audible and/or haptic alarms. In some aspects, the first threshold distance is 9 meters from the machine, the second threshold distance is 6 meters from the machine, and the third threshold distance is 3 meters from the machine. In further aspects, the one or more cameras comprise a camera positioned at the rear of the machine and cameras respectively positioned at left and right sides of the machine. In some aspects, the one or more cameras comprise an object identification system capable of identifying whether the object is a person, whereby the alarm distinguishes the object as a person.

In some embodiments, a proximity warning system can include one or more cameras positioned on a machine, one or more processors, and one or more memory devices. The memory devices can include instructions for execution by the one or more processors. The system can include instructions to receive, from the one or more cameras, image data depicting an object disposed within a field of view of the one or more cameras. The system can include instructions to derive a first distance between the object and the machine based on the image data, and an alarm is triggered when the first distance is less than a first threshold distance. The system can also include instructions to receive a request to snooze the alarm and discontinue the alarm. A buffer zone distance can be defined upon receiving the request to snooze the alarm. Additional image data can be received from the one or more cameras depicting the object, and a second distance between the object and the machine is derived based on the additional image data. The system can include instructions to cancel the snooze and retrigger the alarm when: the second distance is less than a second threshold distance; and the difference between the first distance and the second distance is greater than the buffer zone distance.

In some aspects, the buffer zone distance is proportional to the first distance. According to some aspects, the buffer zone distance is inversely proportional to a speed of the object. In some aspects, the system further comprises instructions to: receive a second request to snooze the alarm; receive, from the one or more cameras, further image data depicting the object; derive a third distance between the object and the machine based on the further image data; and cancel the second snooze and retrigger the alarm when: the third distance is less than a third threshold distance; and the difference between the second distance and the third distance is greater than the buffer zone distance.

In some embodiments, a proximity warning system can include one or more cameras positioned on a machine, one or more processors, and one or more memory devices. The memory devices can include instructions for execution by the one or more processors. The system can include instructions to receive, from the one or more cameras, image data depicting an object disposed within a field of view of the one or more cameras. The system can include instructions to derive a first distance between the object and the machine based on the image data, and an alarm is triggered when the first distance is less than a first threshold distance. The system can also include instructions to receive a request to snooze the alarm and discontinue the alarm. A closing speed between the machine and the object is derived based on the image data upon receiving the request to snooze the alarm. The system can also include instructions to calculate a time period within which the object will be located at a distance less than a second threshold distance, and cancel the snooze and retrigger the alarm when the time period is less than a time threshold (e.g., two seconds).

BRIEF DESCRIPTION OF THE DRAWINGS

The systems and methods described herein may be better understood by referring to the following Detailed Description in conjunction with the accompanying drawings, in which like reference numerals indicate identical or functionally similar elements.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Proximity alarm systems used on machines, such as hydraulic excavators, typically have a method to acknowledge or snooze (pause) an audible alert for an object nearby and/or approaching the machine. Snooze time periods can range from minutes to hours depending on the application. In that time period circumstances can change such that it is desirable to cancel the snooze and retrigger the alarm. Disclosed herein are systems and methods for detection based proximity warning systems including methods to retrigger the system after it has been snoozed. These methods include retriggering an alarm when an object transitions between defined warning zones surrounding the machine. These methods also include retriggering an alarm when the predicted track of an object will cause it to transition between warning zones within a selected threshold period of time. Image-based detection systems can fluctuate greatly depending on the complexity of the image. In other words, the distances for detected objects can vary within a margin of error. Therefore, methods are also disclosed for using a buffer zone to help prevent false alarms when an object is near a distance threshold defining the different zones.

Figure 1:
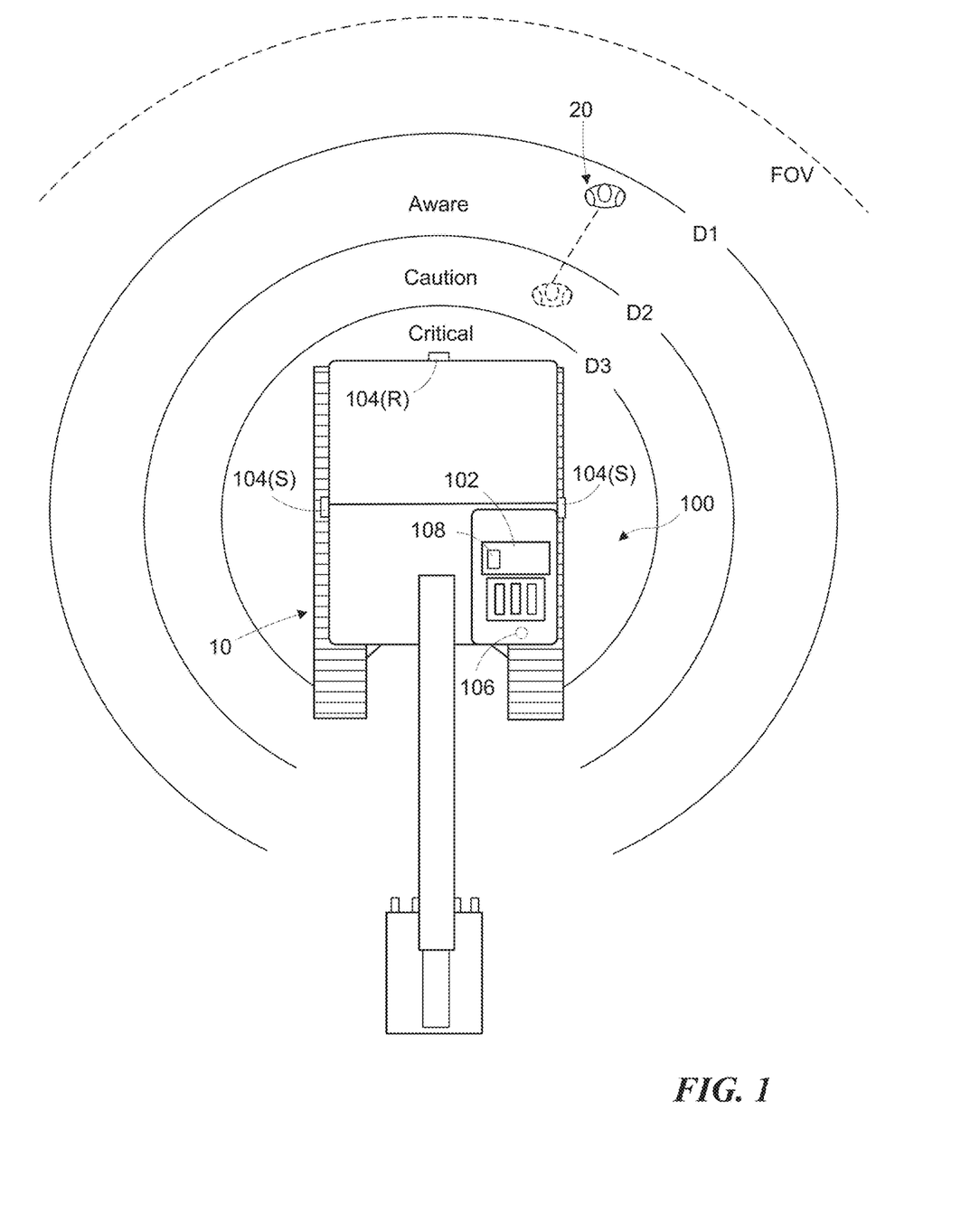
FIG. 1 is a diagram illustrating a method for retriggering a detection based proximity alarm system according to embodiments of the disclosed technology.

FIG. 1 illustrates a machine 10, such as a hydraulic excavator, configured with a detection based proximity warning system 100, according to embodiments of the disclosed technology. The proximity warning system 100 can include a controller 102 and multiple cameras 104. In some embodiments, the system can include a camera 104(R) positioned at the rear of the machine 10 and two cameras 104(S) respectively positioned at left and right sides of the machine 10. The depicted three-camera configuration provides an approximately 270 degree field of view (FOV), wider or narrower fields of view could be employed. In some embodiments, different numbers and positions of cameras can be used. The controller 102 can include one or more processors and one or more memory devices storing instructions to control the alarm system, including methods to retrigger the system after it has been snoozed.

The cameras 104 can be any type of analog or digital image sensor, digital camera, and/or digital video camera. For example, the cameras 104 can be a high dynamic range (HDR) camera, a light-sensitive camera, and/or an ultrasonic camera. In some embodiments, the cameras may provide two-dimensional image data, three-dimensional image data, image sequences, gray image data, and/or color image data. In some embodiments, the system 100 can further include any known type of sensor, such as one or more light detection and ranging (LIDAR) sensors, one or more sound navigation ranging (SONAR) sensors, one or more radio detection and ranging (RADAR) sensors, or any other suitable sensor type. In some embodiments, the cameras comprise an object identification system capable of identifying whether an object is a person, a machine, a vehicle, or other obstacle. In some embodiments, the alarm system is configured to distinguish the object as a person, a machine, a vehicle, or other obstacle in order to further inform the operator as to the nature of the objects(s) around the machine 10. In some embodiments, the cameras can provide, for each object in the FOV, image data including a distance, a bearing angle, and a speed, for example.

The detection based proximity warning system 100 can include multiple warning zones within the FOV. In some embodiments, the warning zones can be defined by threshold distances from the machine. For example, a first threshold distance D1 can define an Aware zone, a second threshold distance D2 can define a Caution zone, and a third threshold distance D3 can define a Critical zone and, as depicted in FIG. 1, the threshold distances can define concentric arcuate regions around machine 10. In some embodiments, the first threshold distance D1 is 9 meters from the machine, the second threshold distance D2 is 6 meters from the machine, and the third threshold distance D3 is 3 meters from the machine. In some embodiments, the thresholds can be configurable. Each warning zone can correspond to different alarm types triggered (i.e., activated) once the object comes closer to the machine 10 than the corresponding threshold distance. For example, the Aware zone can correspond to a visual alarm (e.g., flashing light), the Caution zone can correspond to a combination of audible (e.g., speaker or siren) and visual alarms, and the Critical zone can correspond to audible, visual, and haptic (e.g., vibration mechanism) alarms. In some embodiments, the alarms can be visually output on a display of the machine 10, which can include a user interface that an operator can use for controlling machine operations.

When an object 20, such as a person, enters the Aware zone by crossing the first distance threshold D1, an alarm (e.g., audible alarm device 108) is triggered. Once the alarm is initially triggered the operator can snooze the alarm with the machine's control display or via a manual button 106, for example. Snooze time periods can range from minutes to hours depending on the application. In that time period circumstances can change such that it is desirable to cancel the snooze and retrigger (i.e., reactivate) the alarm. For example, if the object moves closer to the machine within the snooze time period, it may be necessary to cancel the snooze and alert the operator. Thus, if the object 20 enters the Caution zone by crossing the second distance threshold D2, the snooze is canceled and the alarm is retriggered to alert the operator that the object has moved closer to the machine or the machine is approaching the object. It should be noted that the distance between the object and the machine can change due to movement of the object 20 and/or the machine 10.

Because the Aware zone can correspond to only a visual alarm, in some embodiments, the system does not allow the operator to snooze the visual Aware zone alarm. A visual alarm may not be as distracting as an audible and/or haptic alarm and may therefore be less likely to be disabled. Accordingly, in some embodiments, the snooze feature is enabled when the object 20 enters the Caution zone and the alarm is retriggered if the object 20 enters the Critical zone by crossing the third distance threshold D3.

Figure 2:
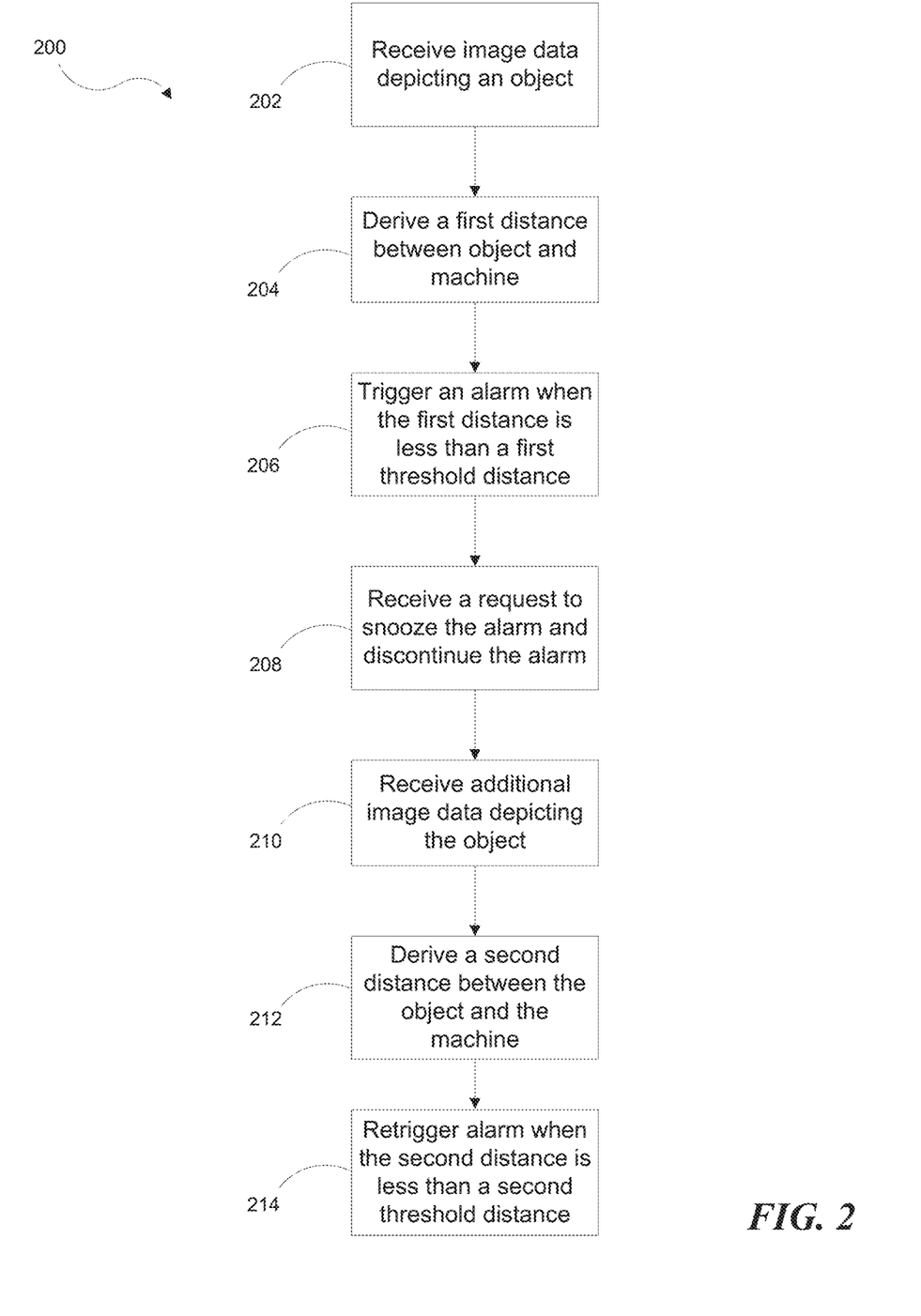
FIG. 2 is a flow diagram showing the method illustrated in FIG. 1.

FIG. 2 is a flow diagram showing a method 200, corresponding to FIG. 1, for controlling the alarm system including retriggering the alarm according to embodiments of the disclosed technology. At step 202, the system receives, from the one or more cameras, image data depicting an object disposed within a field of view of the one or more cameras. At step 204, the system derives a first distance between the object and the machine based on the image data. At step 206, the system triggers an alarm when the first distance is less than a first threshold distance. At step 208, the system receives a request to snooze the alarm and discontinues the alarm. At step 210, the system receives, from the one or more cameras, additional image data depicting the object. At step 212, the system derives a second distance between the object and the machine based on the additional image data. At step 214, the system cancels the snooze and retriggers the alarm when the second distance is less than a second threshold distance. In some embodiments, the method can also include receiving a second request to snooze the alarm; receiving further image data depicting the object; deriving a third distance between the object and the machine based on the further image data; and canceling the second snooze and retriggering the alarm when the third distance is less than a third threshold distance.

Figure 3:
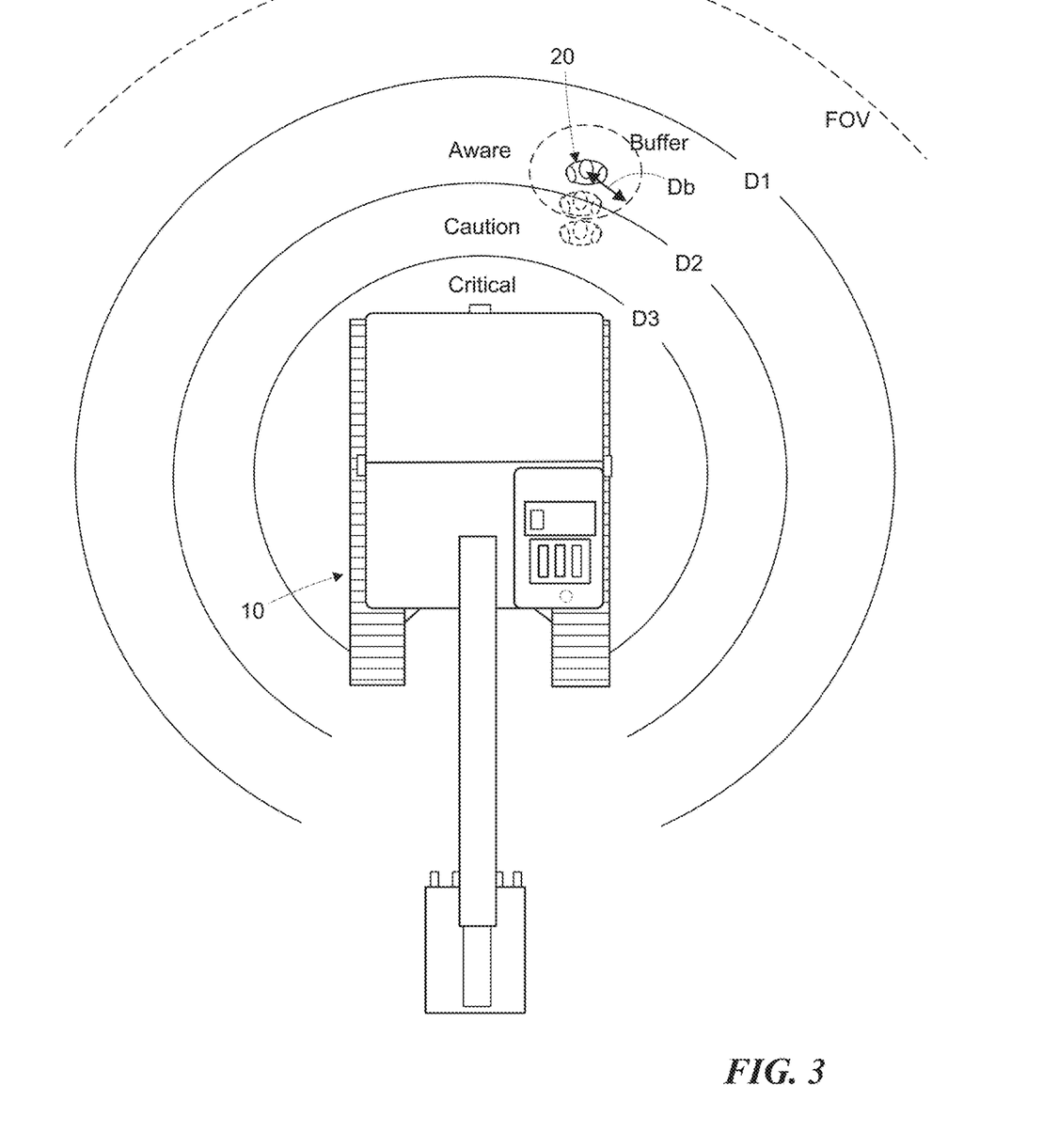
FIG. 3 is a diagram illustrating a method for retriggering a detection based proximity alarm system according to further embodiments of the disclosed technology.

FIG. 3 is a diagram illustrating another method for retriggering a detection based proximity alarm using a buffer zone according to further embodiments of the disclosed technology. When an object 20 enters the Aware zone by crossing the first distance threshold D1, an alarm is triggered. Once the alarm is initially triggered the operator can snooze the alarm. Upon receiving the request to snooze the alarm, the system defines a buffer zone distance Db reflecting the surface of the object 20 (as shown in FIG. 3 the buffer zone has approximately the same shape as the object 20, although as an alternative the buffer zone could be a circle having as its center the center of the object). In some implementations, the buffer zone distance Db can be directly proportional to the first distance. In some implementations, the buffer zone distance Db can be inversely proportional to a speed of the object. The buffer zone distance Db can also be defined based on the type of object e.g., different distances for people as opposed to vehicles.

Image-based detection systems can fluctuate greatly in accuracy depending on the complexity of the image. In other words, the distances for detected objects can vary within a margin of error. The buffer zone prevents false alarms when an object is near a distance threshold defining the different zones. Thus, if the object 20 enters the Caution zone by crossing the second distance threshold D2, the snooze is canceled and the alarm is retriggered only if the object has also moved closer to the machine 10 by the buffer zone distance Db (such distances may be measured in a straight line from the machine 10 to the object 20). The buffer zone also acts to consolidate multiple detections that are within a threshold distance of each other.

Figure 4:
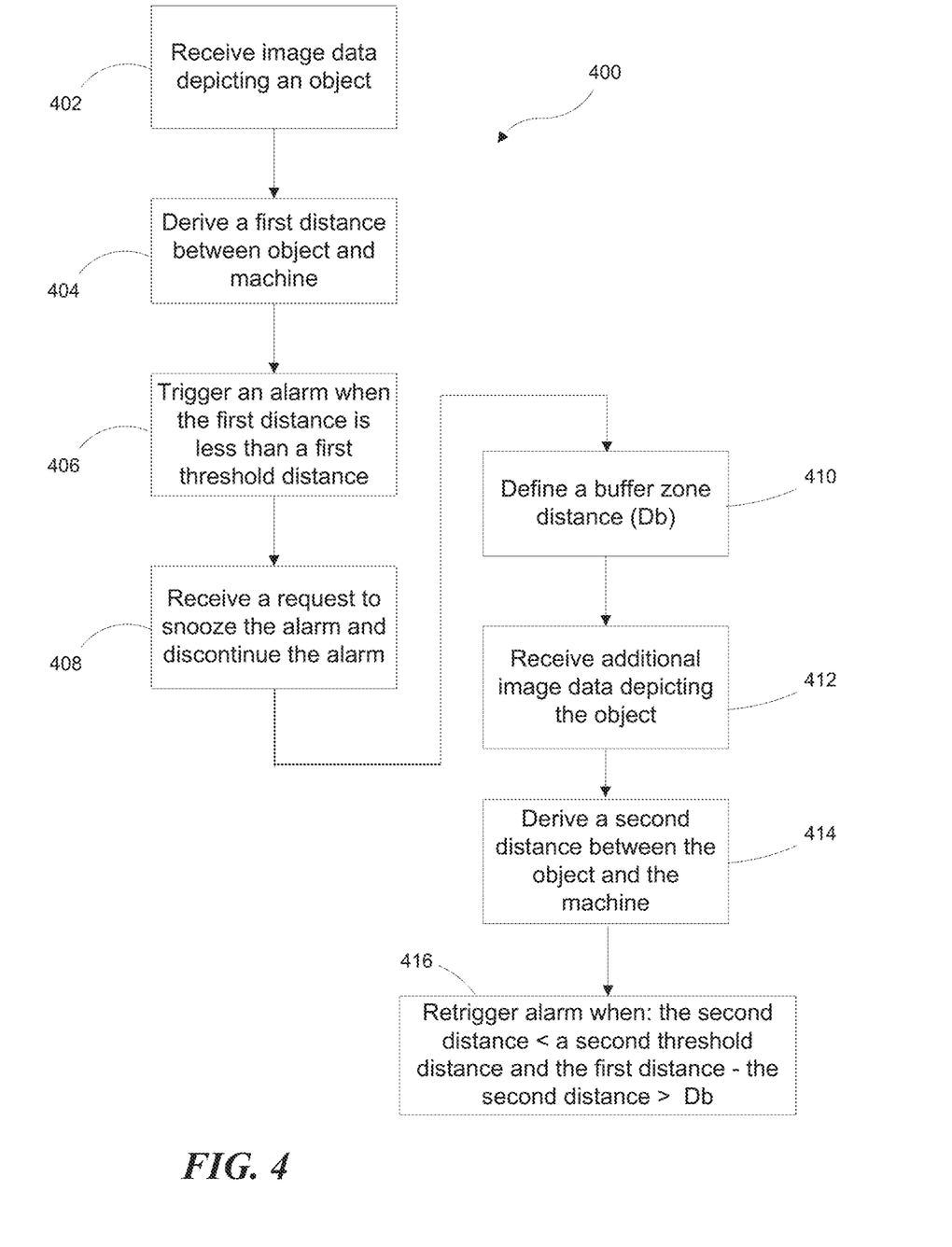
FIG. 4 is a flow diagram showing the method illustrated in FIG. 3.

FIG. 4 is a flow diagram showing a method 400, corresponding to FIG. 3, for controlling the alarm system including retriggering the alarm according to embodiments of the disclosed technology. At step 402, the system receives, from the one or more cameras, image data depicting an object disposed within a field of view of the one or more cameras. At step 404, the system derives a first distance between the object and the machine based on the image data. At step 406, the system triggers an alarm when the first distance is less than a first threshold distance. At step 408, the system receives a request to snooze the alarm and discontinues the alarm. At step 410, the system defines a buffer zone distance upon receiving the request to snooze the alarm. At step 412, the system receives, from the one or more cameras, additional image data depicting the object. At step 414, the system derives a second distance between the object and the machine based on the additional image data. At step 416, the system cancels the snooze and retriggers the alarm when the second distance is less than a second threshold distance, and the difference between the first distance and the second distance is greater than the buffer zone distance. In some embodiments, the method can also include receiving a second request to snooze the alarm; receiving further image data depicting the object; deriving a third distance between the object and the machine; and canceling the second snooze when: the third distance is less than a third threshold distance, and the difference between the second distance and the third distance is greater than the buffer zone distance.

Figure 5:
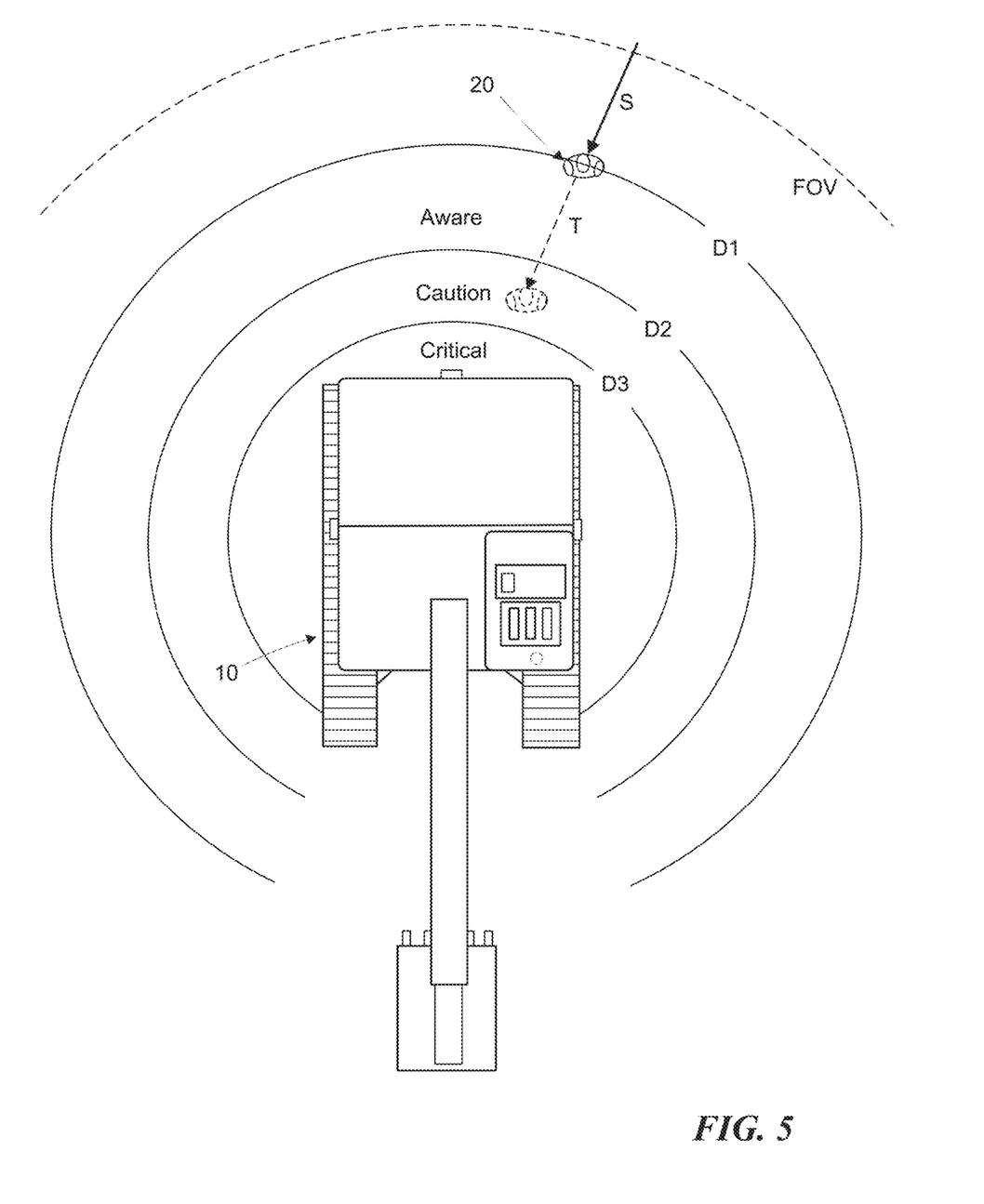
FIG. 5 is a diagram illustrating a method for retriggering a detection based proximity alarm system according to further embodiments of the disclosed technology.

FIG. 5 is a diagram illustrating another method for retriggering a detection based proximity alarm using the object's path trajectory or track (e.g., speed) according to further embodiments of the disclosed technology. When an object 20 enters the Aware zone by crossing the first distance threshold D1, an alarm is triggered. Once the alarm is initially triggered the operator can snooze the alarm. Upon receiving the request to snooze the alarm, the system derives a closing speed S between the machine and the object 20. If the speed S and distance D1 of the object will result in the object 20 entering the next threat zone (e.g., D2 Caution zone) within a configurable threshold period of time t, the snooze is canceled and the alarm is retriggered. Using the object's track information to cancel the snooze and retrigger the alarm can provide faster retriggering for fast approaching objects to provide an operator more time to react.

Figure 6:
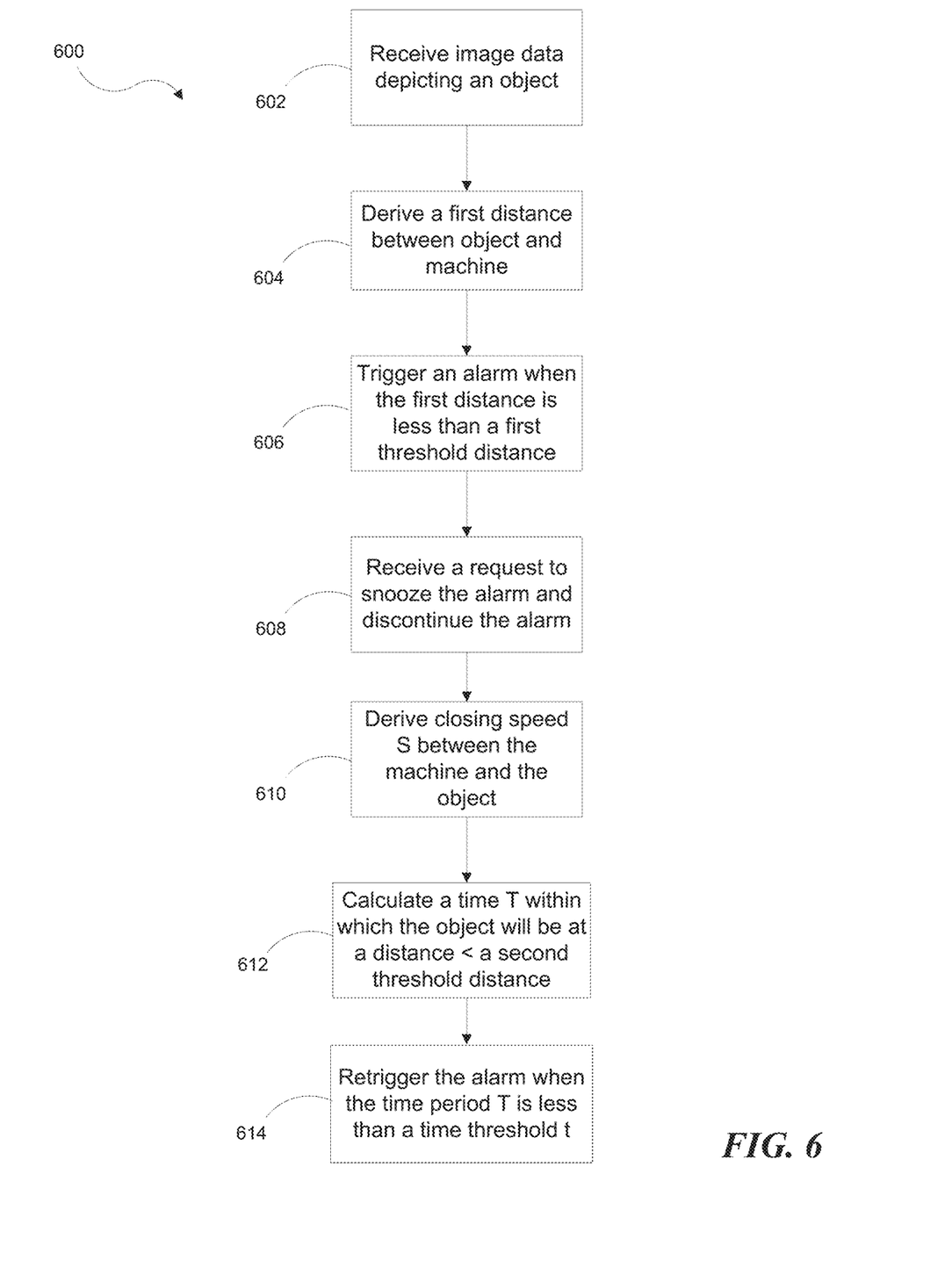
FIG. 6 is a flow diagram showing the method illustrated in FIG. 5.

FIG. 6 is a flow diagram showing a method 600, corresponding to FIG. 5, for controlling the alarm system including retriggering the alarm according to embodiments of the disclosed technology. At step 602, the system receives, from the one or more cameras, image data depicting an object disposed within a field of view of the one or more cameras. At step 604, the system derives a first distance between the object and the machine based on the image data. At step 606, the system triggers an alarm when the first distance is less than a first threshold distance. At step 608, the system receives a request to snooze the alarm and discontinues the alarm. At step 610, the system derives a closing speed S between the machine and the object based on the image data upon receiving the request to snooze the alarm. At step 612, the system calculates a time period T within which the object will be located at a distance less than a second threshold distance. At step 614, the system cancels the snooze and retriggers the alarm when the time period T is less than a time threshold t. In some embodiments, the time threshold t can be two seconds.

The above described systems and methods for retriggering proximity alarms can be used in combination with each other as well as in conjunction with various alarm retriggering events. For example, a snoozed alarm can be retriggered when a machine's hydraulic lock transitions from enabled (locked) to disabled (unlocked), when the machine trams a configurable fixed distance, and/or when the machine trams over a configurable speed threshold. If desired, systems as outlined above can be configured to retrigger object alerts when no objects have been detected for a predetermined amount of time, e.g. ten minutes.

Suitable System

The techniques disclosed here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs, DVDs, Blu-Ray disks), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 7:
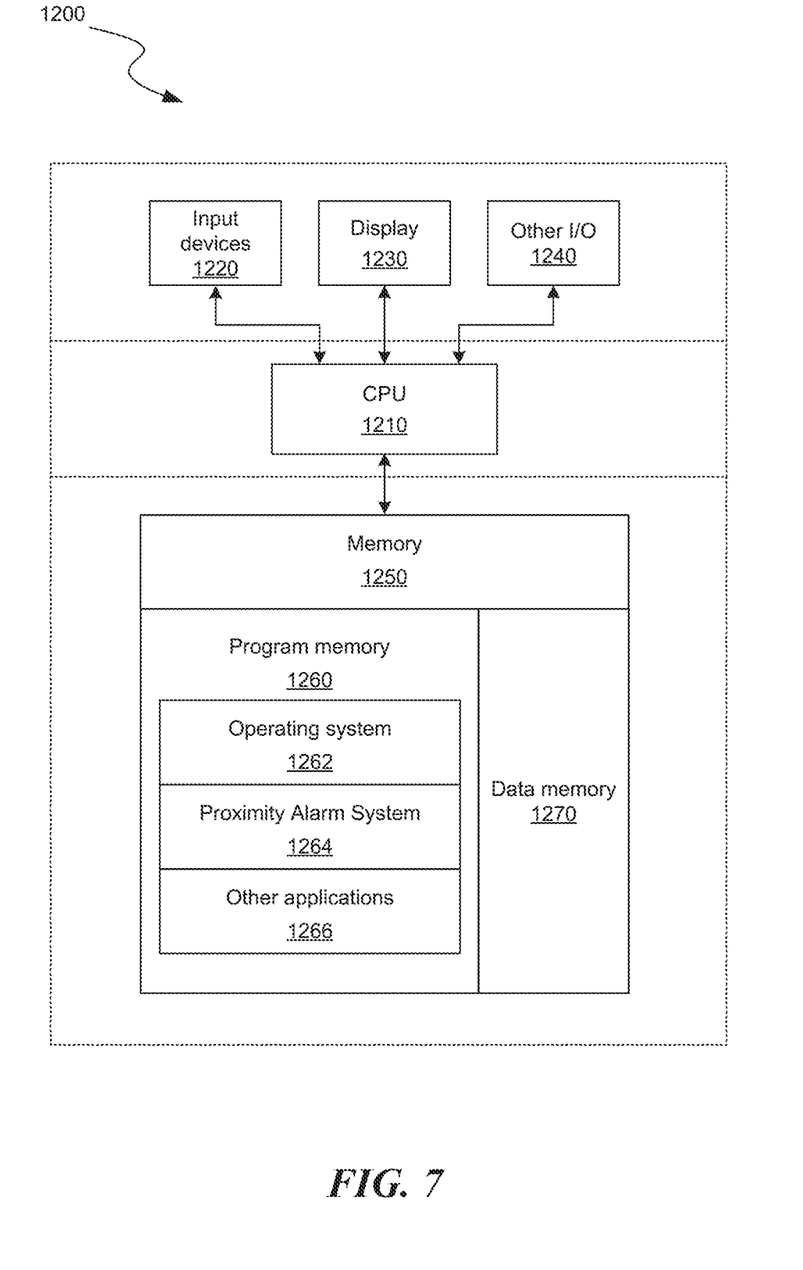
FIG. 7 is a block diagram illustrating an overview of devices on which some implementations can operate.

Several implementations are discussed below in more detail in reference to the figures. FIG. 7 is a block diagram illustrating an overview of devices on which some implementations of the disclosed technology can operate. The devices can comprise hardware components of a device 1200. Device 1200 can include one or more input devices 1220 that provide inputs to the CPU (processor) 1210, notifying it of actions. The actions are typically mediated by a hardware controller that interprets the signals received from the input device and communicates the information to the CPU 1210 using a communication protocol. Input devices 1220 include, for example, a mouse, a keyboard, a touchscreen, an infrared sensor, a touchpad, a wearable input device, a camera- or image-based input device, a microphone, or other user input devices.

CPU 1210 can be a single processing unit or multiple processing units in a device or distributed across multiple devices. CPU 1210 can be coupled to other hardware devices, for example, with the use of a bus, such as a PCI bus or SCSI bus. The CPU 1210 can communicate with a hardware controller for devices, such as for a display 1230. Display 1230 can be used to display text and graphics. In some examples, display 1230 provides graphical and textual visual feedback to a user. In some implementations, display 1230 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 1240 can also be coupled to the processor, such as a network card, video card, audio card, audible and/or visual alarms, USB, FireWire or other external device, sensor, camera, printer, speakers, CD-ROM drive, DVD drive, disk drive, or Blu-Ray device.

In some implementations, the device 1200 also includes a communication device capable of communicating wirelessly or wire-based with a network node. The communication device can communicate with another device or a server through a network using, for example, TCP/IP protocols. Device 1200 can utilize the communication device to distribute operations across multiple network devices.

The CPU 1210 can have access to a memory 1250. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, Blu-Ray disks, magnetic storage devices, tape drives, device buffers, and so forth. A memory is not a propagating signal divorced from underlying hardware; a memory is thus non-transitory. Memory 1250 can include program memory 1260 that stores programs and software, such as an operating system 1262, Proximity Alarm System 1264, and other application programs 1266. Memory 1250 can also include data memory 1270 that can include database information, etc., which can be provided to the program memory 1260 or any element of the device 1200.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, programmable consumer electronics, network PCs, minicomputers, mainframe computers, distributed computing environments that include any of the above systems or devices, or the like.

Figure 8:
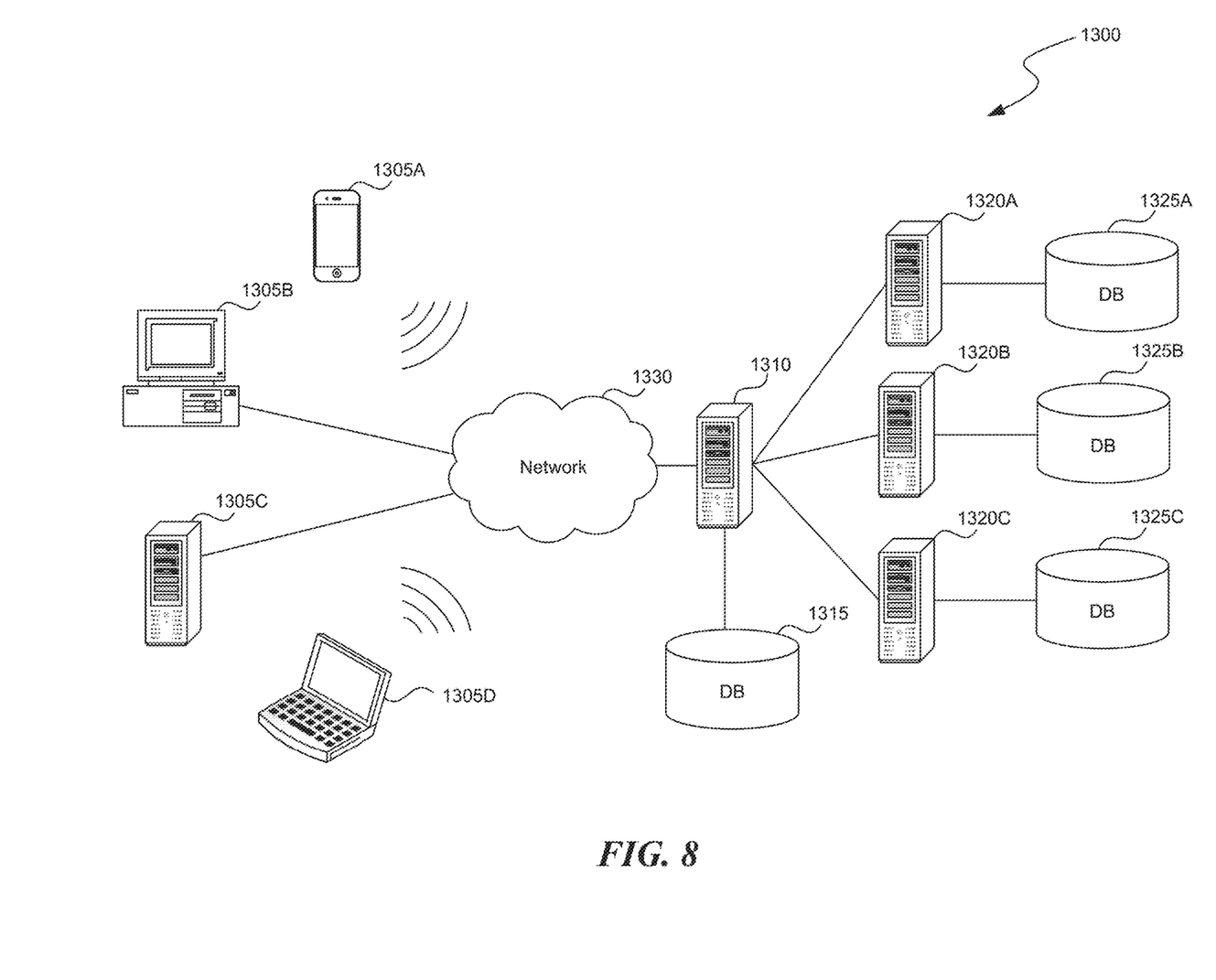
FIG. 8 is a block diagram illustrating an overview of an environment in which some implementations can operate.

FIG. 8 is a block diagram illustrating an overview of an environment 1300 in which some implementations of the disclosed technology can operate. Environment 1300 can include one or more client computing devices 1305A-D, examples of which can include device 1200. Client computing devices 1305 can operate in a networked environment using logical connections through network 1330 to one or more remote computers, such as a server computing device 1310.

In some implementations, server computing device 1310 can be an edge server that receives client requests and coordinates fulfillment of those requests through other servers, such as servers 1320A-C. Server computing devices 1310 and 1320 can comprise computing systems, such as device 1200. Though each server computing device 1310 and 1320 is displayed logically as a single server, server computing devices can each be a distributed computing environment encompassing multiple computing devices located at the same or at geographically disparate physical locations. In some implementations, each server computing device 1320 corresponds to a group of servers.

Client computing devices 1305 and server computing devices 1310 and 1320 can each act as a server or client to other server/client devices. Server 1310 can connect to a database 1315. Servers 1320A-C can each connect to a corresponding database 1325A-C. As discussed above, each server 1320 can correspond to a group of servers, and each of these servers can share a database or can have their own database. Databases 1315 and 1325 can warehouse (e.g., store) information. Though databases 1315 and 1325 are displayed logically as single units, databases 1315 and 1325 can each be a distributed computing environment encompassing multiple computing devices, can be located within their corresponding server, or can be located at the same or at geographically disparate physical locations.

Network 1330 can be a local area network (LAN) or a wide area network (WAN), but can also be other wired or wireless networks. Network 1330 may be the Internet or some other public or private network. Client computing devices 1305 can be connected to network 1330 through a network interface, such as by wired or wireless communication. While the connections between server 1310 and servers 1320 are shown as separate connections, these connections can be any kind of local, wide area, wired, or wireless network, including network 1330 or a separate public or private network.

Figure 9:
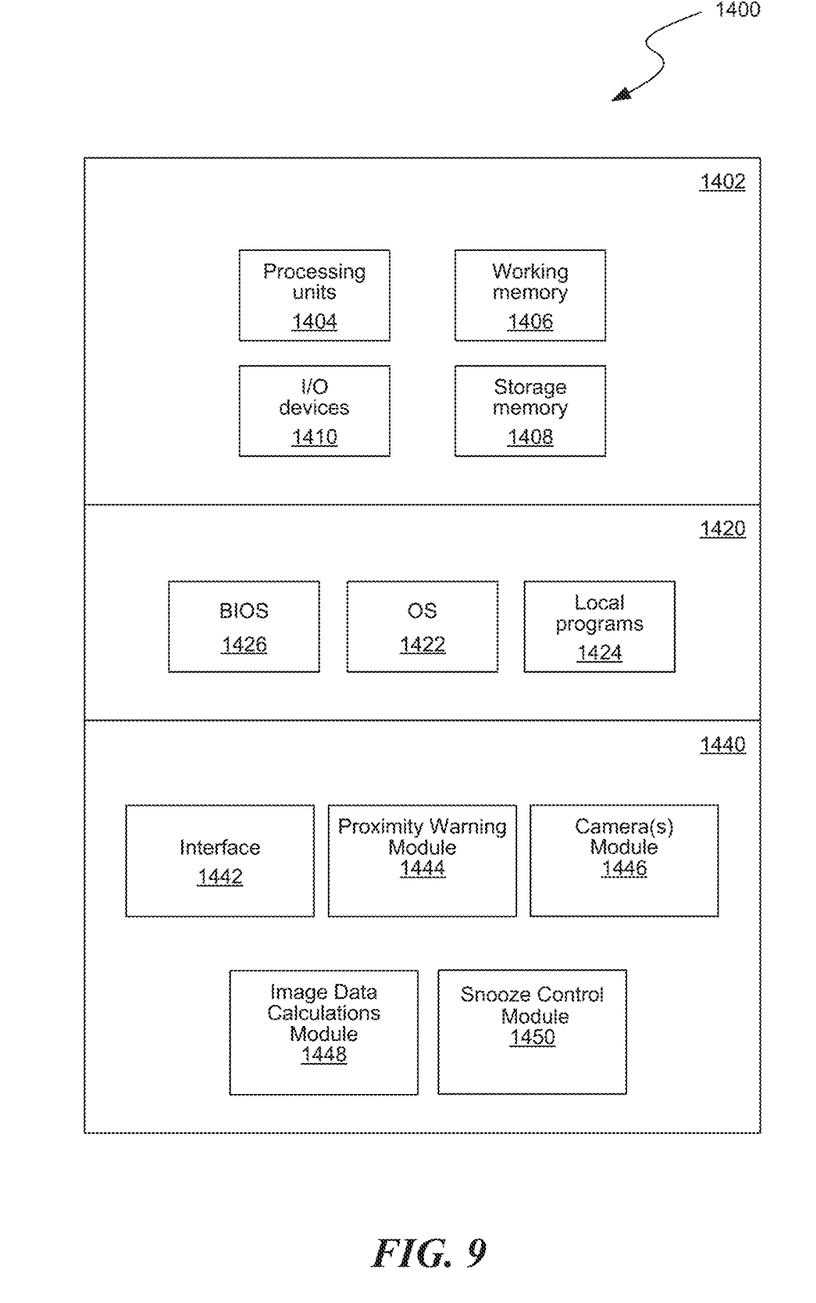
FIG. 9 is a block diagram illustrating components which, in some implementations, can be used in a system employing the disclosed technology.

FIG. 9 is a block diagram illustrating components 1400 which, in some implementations, can be used in a system employing the disclosed technology. The components 1400 include hardware 1402, general software 1420, and specialized components 1440. As discussed above, a system implementing the disclosed technology can use various hardware, including processing units 1404 (e.g., CPUs, GPUs, APUs, etc.), working memory 1406, storage memory 1408, and input and output devices 1410. Components 1400 can be implemented in a client computing device such as client computing devices 1305 or on a server computing device, such as server computing device 1310 or 1320.

General software 1420 can include various applications, including an operating system 1422, local programs 1424, and a basic input output system (BIOS) 1426. Specialized components 1440 can be subcomponents of a general software application 1420, such as local programs 1424. Specialized components 1440 can include a Proximity Warning Module 1444, a Camera(s) Module 1446, an Image Data Calculations Module 1448, a Snooze Control Module 1450, and components that can be used for transferring data and controlling the specialized components, such as Interface 1442. In some implementations, components 1400 can be in a computing system that is distributed across multiple computing devices or can be an interface to a server-based application executing one or more of specialized components 1440.

Those skilled in the art will appreciate that the components illustrated in FIGS. 7-9 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described herein.

INDUSTRIAL APPLICABILITY

In some embodiments, a proximity warning system can include a Proximity Warning Module 1444, a Camera Module 1446, an Image Data Calculations Module 1448, and a Snooze Control Module 1450 (FIG. 9). In operation, the Camera Module 1446 can receive, from the one or more cameras, image data depicting an object disposed within a field of view of the one or more cameras. The Image Data Calculations Module 1448 can derive a first distance between the object and the machine based on the image data. The Proximity Warning Module 1444 can trigger an alarm when the first distance is less than a first threshold distance. The Snooze Control Module 1450 can receive a request to snooze the alarm and discontinue the alarm.

In some embodiments, the Camera Module 1446 can receive, from the one or more cameras, additional image data depicting the object and Image Data Calculations Module 1448 can derive a second distance between the object and the machine based on the additional image data. The Snooze Control Module 1450 can cancel the snooze and retrigger the alarm when the second distance is less than a second threshold distance.

In some embodiments, the Snooze Control Module 1450 can also define a buffer zone distance upon receiving the request to snooze the alarm. The Camera Module 1446 can receive, from the one or more cameras, additional image data depicting the object and the Image Data Calculations Module 1448 can derive a second distance between the object and the machine based on the additional image data. The Snooze Control Module 1450 can cancel the snooze and retrigger the alarm when the second distance is less than a second threshold distance, and the difference between the first distance and the second distance is greater than the buffer zone distance.

In some embodiments, the Image Data Calculations Module 1448 can derive a closing speed between the machine and the object based on the image data upon receiving the request to snooze the alarm. The Image Data Calculations Module 1448 can also calculate a time period within which the object will be located at a distance less than a second threshold distance. The Snooze Control Module 1450 can cancel the snooze and retrigger the alarm when the time period is less than a time threshold

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A proximity warning system, comprising:
   one or more cameras positioned on a machine;
   one or more processors; and
   one or more memory devices having stored thereon instructions that when executed by the one or more processors cause the one or more processors to:
      receive, from the one or more cameras, image data depicting an object disposed within a field of view of the one or more cameras;
      derive a first distance between the object and the machine based on the image data;
      trigger an alarm when the first distance is less than a first threshold distance;
      receive a request to snooze the alarm, the snooze configured to discontinue the alarm for a predetermined period of time and prevent retriggering of the alarm when the object is beyond a second threshold during the period of time;
      receive, from the one or more cameras, additional image data depicting the object;
      derive a second distance between the object and the machine based on the additional image data; and
      cancel the snooze and retrigger the alarm when the second distance is less than the second threshold distance.

2. The system of claim 1, further comprising instructions to:
   receive a second request to snooze the alarm;
   receive, from the one or more cameras, further image data depicting the object;
   derive a third distance between the object and the machine based on the further image data; and
   cancel the second snooze and retrigger the alarm when the third distance is less than a third threshold distance.

3. The system of claim 2, wherein the first threshold distance corresponds to a visual alarm and the second and third threshold distances correspond respectively to audible and haptic alarms.

4. The system of claim 2, wherein the first threshold distance is 9 meters from the machine, the second threshold distance is 6 meters from the machine, and the third threshold distance is 3 meters from the machine.

5. The system of claim 1, wherein the one or more cameras comprise a camera positioned at the rear of the machine and cameras respectively positioned at left and right sides of the machine.

6. The system of claim 1, wherein the one or more cameras comprise an object identification system capable of identifying whether the object is a person, whereby the alarm distinguishes the object as a person.

7. A proximity warning system, comprising:
   one or more cameras positioned on a machine;
   one or more processors; and
   one or more memory devices having stored thereon instructions that when executed by the one or more processors cause the one or more processors to:
      receive, from the one or more cameras, image data depicting an object disposed within a field of view of the one or more cameras;
      derive a first distance between the object and the machine based on the image data;
      trigger an alarm when the first distance is less than a first threshold distance;
      receive a request to snooze the alarm, the snooze configured to discontinue the alarm for a predetermined period of time and prevent retriggering of the alarm when the object is beyond at least a second threshold during the period of time;
      define a buffer zone distance upon receiving the request to snooze the alarm;
      receive, from the one or more cameras, additional image data depicting the object;
      derive a second distance between the object and the machine based on the additional image data; and
      cancel the snooze and retrigger the alarm when:
         the second distance is less than the second threshold distance; and
         the difference between the first distance and the second distance is greater than the buffer zone distance.

8. The system of claim 7, wherein the buffer zone distance is proportional to the first distance and the buffer zone distance reflecting the surface of the object.

9. The system of claim 8, wherein the buffer zone distance is inversely proportional to a speed of the object.

10. The system of claim 7, further comprising instructions to:
    receive a second request to snooze the alarm;
    receive, from the one or more cameras, further image data depicting the object;
    derive a third distance between the object and the machine based on the further image data; and
    cancel the second snooze and retrigger the alarm when:

the third distance is less than a third threshold distance; and the difference between the second distance and the third distance is greater than the buffer zone distance.

11. The system of claim 10, wherein the first threshold distance corresponds to a visual alarm and the second and third threshold distances correspond respectively to audible and haptic alarms.

12. The system of claim 11, wherein the first threshold distance is 9 meters from the machine, the second threshold distance is 6 meters from the machine, and the third threshold distance is 3 meters from the machine.

13. The system of claim 7, wherein the one or more cameras comprise a camera positioned at the rear of the machine and cameras respectively positioned at left and right sides of the machine.

14. The system of claim 7, wherein the one or more cameras comprise an object identification system capable of identifying whether the object is a person, whereby the alarm distinguishes the object as a person.

15. A proximity warning system, comprising:
one or more cameras positioned on a machine;
one or more processors; and
one or more memory devices having stored thereon instructions that when executed by the one or more processors cause the one or more processors to:
  receive, from the one or more cameras, image data depicting an object disposed within a field of view of the one or more cameras;
  derive a first distance between the object and the machine based on the image data;
  trigger an alarm when the first distance is less than a first threshold distance;
  receive a request to snooze the alarm, the snooze configured to discontinue the alarm for a predetermined period of time and prevent retriggering of the alarm when the object is beyond a second threshold during the period of time;
  derive a closing speed between the machine and the object based on the image data upon receiving the request to snooze the alarm;
  calculate a time period within which the object will be located at a distance less than the second threshold distance; and
  cancel the snooze and retrigger the alarm when the time period is less than a time threshold.

16. The system of claim 15, wherein the time threshold is 2 seconds.

17. The system of claim 15, wherein the first threshold distance corresponds to a visual alarm and the second threshold distance corresponds to audible and visual alarms.

18. The system of claim 15, wherein the first threshold distance is 9 meters from the machine and the second threshold distance is 6 meters from the machine.

19. The system of claim 15, wherein the one or more cameras comprise a camera positioned at the rear of the machine and cameras respectively positioned at left and right sides of the machine.

20. The system of claim 15, wherein the one or more cameras comprise an object identification system capable of identifying whether the object is a person, whereby the alarm distinguishes the object as a person.

* * * * *